United States Patent
Weiss et al.

(10) Patent No.: US 12,236,954 B1
(45) Date of Patent: Feb. 25, 2025

(54) SPEECH ENABLING SYSTEM

(71) Applicants: Justin Benjamin Weiss, Parkland, FL (US); Jeffrey N. Weiss, Parkland, FL (US)

(72) Inventors: Justin Benjamin Weiss, Parkland, FL (US); Jeffrey N. Weiss, Parkland, FL (US)

(*) Notice: Subject to any disclaimer, the term of this patent is extended or adjusted under 35 U.S.C. 154(b) by 0 days.

(21) Appl. No.: 18/590,341

(22) Filed: Feb. 28, 2024

(51) Int. Cl.
*G10L 15/25* (2013.01)

(52) U.S. Cl.
CPC .................... *G10L 15/25* (2013.01)

(58) Field of Classification Search
CPC ....... G06F 18/253; G10L 15/02; G10L 15/25; G10L 15/005; G10L 15/24; G10L 17/10; G06V 40/171
See application file for complete search history.

(56) References Cited

U.S. PATENT DOCUMENTS

| | | | | |
|---|---|---|---|---|
| 10,937,414 | B2 * | 3/2021 | Berenzweig | G10L 15/063 |
| 2012/0259554 | A1 * | 10/2012 | Chen | A61F 4/00 |
| | | | | 702/19 |
| 2018/0158450 | A1 * | 6/2018 | Tokiwa | G10L 25/57 |
| 2019/0348025 | A1 * | 11/2019 | Berenzweig | G06F 3/015 |
| 2019/0348027 | A1 * | 11/2019 | Berenzweig | G10L 15/14 |
| 2023/0098678 | A1 * | 3/2023 | Zhang | G10L 17/10 |
| | | | | 704/231 |

* cited by examiner

Primary Examiner — Angela A Armstrong
(74) Attorney, Agent, or Firm — DANIEL S. POLLEY, P.A.

(57) ABSTRACT

A system and method for recognizing (reading) the tongue movements, vocalizations, and throat vibrations of a person and converting (translating) them into meaningful synthesized words, which could be pronounced by an electronic speaker and/or displayed on a display. Often a patient/person who has lost the ability to speak may still be able to move their tongues, or make unfathomable sounds, which cannot be recognized as intelligible words. The system and method can continuously record the movement of the patient's tongue, vocalizations, and throat sounds and extract small video segments corresponding to different words attempted by the patient. Each of these video segments can then be analyzed by AI software or other configured software to match the specific tongue movement with a pre-learned reference word, and once identified, the computer/system can speak or verbalize the word, and/or display it on a screen. The set of pre-learned reference words can be recorded and saved during the training session(s) for each individual patient. During the training session(s), the embedded AI software or other configured software can ask the patient to say a specific word multiple times and for each time, the system/software can record the associated tongue movements, and any verbalizations, and throat vibrations. Multiple recordings for a single word can be preferably performed so that the AI software or other configured software can capture all possible movement variations of the same word and can aggregate some common features as unique identification for that word, which can be saved in the system as a reference to that specific word.

20 Claims, 5 Drawing Sheets

SPEECH ENABLING SYSTEM

1. FIELD OF THE DISCLOSURE

The disclosure relates generally to communication systems and more specifically to a speech enabling system preferably for use by disabled persons.

2. BACKGROUND OF THE DISCLOSURE

The ability to speak is the most basic form of communication. Speaking consists of two major components, the ability of the brain to compose and comprehend language, and the motor ability of the speech organs to form and express the appropriate sounds. There are many types and etiologies of speaking impairment, including:

Aphasia

Aphasia is the inability to produce language due to a brain injury such as a stroke or cerebrovascular accident (CVA), traumatic brain injury (TBI), dementia, brain infection, or tumors. There are many types of aphasia (Boston classification): Expressive aphasia (Broca's aphasia), Receptive aphasia (Wernicke's aphasia), conduction aphasia, mixed transcortical aphasia, transcortical motor aphasia, transcortical sensory aphasia, global aphasia, and anomic aphasia.

Aphasia is related to an individual's cognition, not to the mechanics of speech such as a hearing impairment or paralysis of the muscles integral in speaking. By definition, aphasia is caused by an acquired injury to the brain and does not include neurodevelopmental auditory processing disorders. The patient's symptoms depend on the location of the portion of the brain that is affected.

Apraxia

Apraxia of speech (AOS) or verbal apraxia, affects purposeful and automatic speech. It is the loss of the prior ability to speak resulting from a brain injury. Patients with AOS are unable to translate their conscious speech into motor plans. There is a disconnect of speech from the brain to the mouth. The patient knows what they want to say, but is unable to signal the appropriate muscles for the mechanical speech movement. 60% of acquired AOS is due to a stroke or CVA.

Dysarthria

Dysarthria results from a neurologic injury that affects the muscles that help produce speech. An injury to the central or peripheral nervous system affecting the speech producing components such as, respiration, resonance, phonation, articulation, and prosody may cause dysarthria. Weakness, paralysis, or affected coordination may affect the lips, tongue, throat, or lungs. It does not include speech impairments resulting from facial structural abnormalities, i.e. cleft palate.

The pertinent cranial nerves related to this condition are the motor branch of the trigeminal nerve (Cranial nerve #V), facial nerve (#VI), glossopharyngeal nerve (IX), vagus nerve (X), and the hypoglossal nerve (XII).

There are several different types of dysarthria: spastic, resulting from unilateral or bilateral upper motor neuron damage, flaccid, resulting from either unilateral or bilateral lower motor neuron damage, ataxic, resulting from cerebellum damage, hyper/hypokinetic, from damage to the basal ganglia, and mixed dysarthria, resulting from multiple causes.

Though not limiting, it is preferably for patients with dysarthria, due to an inability to utilize the facial muscles to produce speech, that the novel system and method described herein is directed for aiding communication by such patients.

SUMMARY OF THE DISCLOSURE

A novel speech enabling system and method is disclosed herein. The system can include a controller box, which can be a self-contained embedded computer, though not considered limiting. Externally accessible on the controller box can be a user's screen or display, a speaker grid allowing sound/audio from an internally disposed speaker to be heard, control knobs and connectors for connecting one or more of the preferred other components of the system, such as, without limitation a hand squeezer, headset and monitor. Internally within the housing of the controller box can be the preferred main embedded computer, a battery (though a wired version can also be provided eliminating the need for a battery), a speaker and other control and interface circuitry and/or electronics.

In a preferred, though non-limiting, embodiment, the controller box can be mounted or otherwise secured on top of the headset. The headset can include a camera which is position/pointed at the patient's mouth/tongue. When the system is in an active mode, where the patient is moving his or her tongue or possibly making noises, the display and/or speaker shows and/or announces, respectively, the spoken words associated with the patient's actions, as determined by the embedded computer preferably disposed within the controller box. The system can also include a support device. Though not limiting, the support device can be a portable electronic device, such as a smartphone and/or tablet (e.g. iPad, etc.) that can be held or other otherwise used by a caregiver which can be configured for use to properly set up the camera position and all other parameters. Accordingly, during the Active Mode while the patient is wearing the headset and attempts to says words by tongue movements and/or throat vocalization, the software operating or run on the embedded computer (which can be or include AI software) receives the inputs from the various components and translates or otherwise converts these word attempts into displayed and/or spoken words (i.e. on the monitor and/or through the speaker).

When the system is being used in the Training Mode, preferably the patient wears the headset (preferably with controller box secured thereto) and the patient preferably interacts with two devices, namely, the hand squeezer and the monitor, while the vibration sensor reads the patient's throat signals. Preferably, the monitor can display a message that instructs the patient to squeeze the hand squeeze and verbally say a selected word. The software operating or being run on the embedded computer (which can be or include AI software) records the patient's tongue movements, vocalizations and throat vibrations (if any) and extracts their features. Camera positioning and training parameters can all be controlled by the above noted support device which can be preferably held and/or operated by a caregiver or other individual. Accordingly, during the Training Mode while the patient is wearing the headset and is interacting with the instructions on the monitor, the software operating or run on the embedded computer (which can be or include AI software) can preferably ask the patient to say a word after a triggering squeeze. The software records and analyzes the patient's tongue movement and throat vibration and possible vocalizations from saying the word. Preferably, the system can repeat the same word at least a predetermined number of times to allow the system to gain tolerance over tongue movements and/or throat vibration variations.

DETAILED DESCRIPTION

A novel speech enabling system and method are generally disclosed and the system can preferably include, without limitation, one or more of the following components: (a) a controller box/housing/body (collectively "controller box"); (b) a headphone set to be worn by the patient preferably having a microphone and camera; (c) a vibration sensor attached to the patent, such as, without limitation adhered or taped on the neck of the patient next to throat; (d) a squeezing device for use by the patient to squeeze to indicate an action; (e) an external monitor; (f) an electronic device, preferably hand-held, such as a minicomputer, a tablet or a smart phone; and (g) a software program such as an embedded Artificial Intelligence algorithm. The system and method, including the above identified components will be described further below.

Figure 1A:
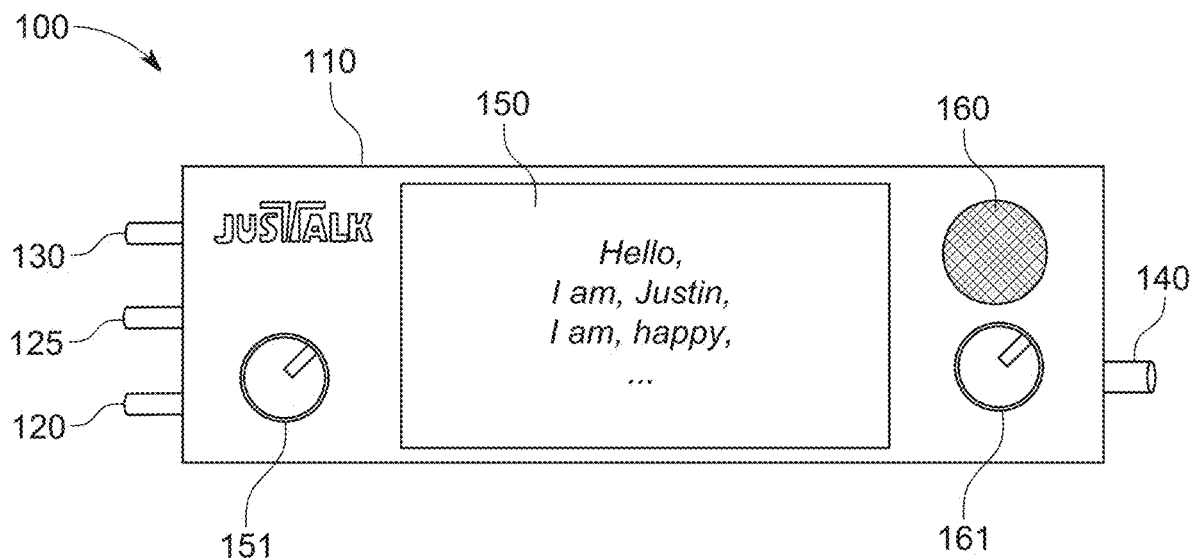
FIGS. 1A and 1B illustrate a non-limiting embodiment for the controller box of the novel speech enablement system in accordance with the present disclosure.
Figure 1B:
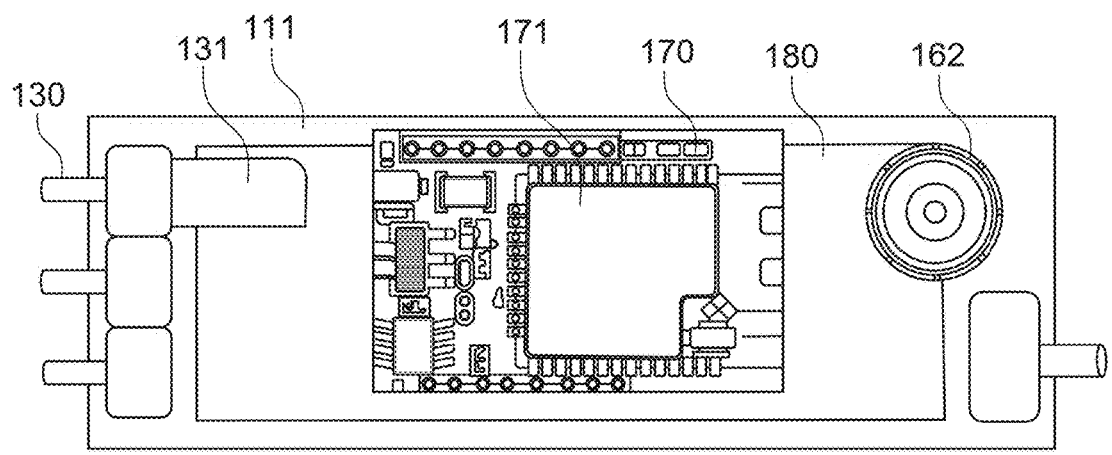

As seen in FIGS. 1A and 1B, a first embodiment for a controller box 100 of the speech enabling system is shown. Though not limiting, controller box 100 can be a self-contained embedded computer. As externally seen in FIG. 1A, controller box 100 can include or comprises a self-contained Box 110, which can be preferably mountable or otherwise secured to or on the top of headphone/headset 220 of the novel speech enabling system or another chosen location. Controller box 100 can be provided with a screen or display 150, to display the mode of operation being preferably in a Training mode or an Active mode, and the details thereof, as well as other information.

Preferably, though not limiting, in a "Training Mode", screen 150 can display one or more or all settings that are configured by the caregiver and in an "Active Mode" the words the patient is trying to say can be spelled out and displayed on screen 150. An internal speaker 162 aligned with an externally seen speaker grill 160 can also be provided, which synthesizes spoken words. Controller box 100 can be provided with one or more control knobs. In a preferred, non-limiting embodiment, two control knobs 151 and 161 can be provided.

Rotating knob 161 preferably clockwise (though not limiting), can be used to turn on the disclosed novel speech enabling system. Turning of knob 161 can also be used to adjust the volume (i.e., from silence (minimum volume) to maximum volume—as the knob is preferably turned clockwise. The turning/rotating of knob 151 can be used to switch between Training and Active modes, and to navigate through all of the Settings and Control Menus. As noted above a plurality of connector sockets (or electrical ports, USB ports, USB-C ports, etc.) can be provided and externally accessible.

The connector sockets can include a hand-held Squeezer Socket 130, which can be based on air pressure as the patient squeezes. A pressure sensor with adjustable levels can be utilized instead of a dry switch given that the patient may have different abilities regarding how well they are able to squeeze. A Vibration Sensor Socket 125 can be included. The Vibration Sensor can transmit the throat vibration as detected from the patient neck where the Vibration Sensor is attached to the patient (preferably at the back of the patient's neck, though not considered limiting) and electrically connected to controller box 100 through Vibration Sensor Socket 125.

The Headset Socket 120 where a headset 220 can be preferably electrically connected to controller box 100 (though headset 220 can also be wirelessly connected—in communication with controller box 100) to transmit its video and audio signals to the Embedded Computer 170. Monitor Socket 140 provides a connection point for a monitor 340, particularly during the Training Mode where monitor 340 is preferably primarily used.

As noted above, one or more of these wired connections through the various connector sockets can be replaced or substituted through use of wireless transmissions between the one or more of the components providing the various information and data to controller box 100 and the wireless communications are also considered within the scope of the disclosure.

As best seen in FIG. 1B, inside Controller Box 100 the following components can preferably be provided:
(a) a main system Printed Circuit Board (PCB) 111, which can integrate all internal circuits;
(b) a main Embedded Computer 170, which can be a multi-core microcontroller or microprocessor with high-speed processing suitable for video and graphics analysis. Preferably, Computer 170 can be provided with built-in WiFi and Bluetooth technologies for communication with external devices such as the Speech Enabling System ("SES") Support Device 250 which is held by the Caregiver. Other now known or later developed communication technologies can also be used in addition to WiFi and/or Bluetooth technologies or in lieu of and are also considered within the scope of the disclosure;
(c) a main SES AI Software 171 preferably residing inside and running on Embedded Computer 170. AI Software 171 can run both SES modes of operations. In the Training Mode, AI Software 171 can ask the patient to speak one word at a time to learn the words. In the Active Mode, where the patient is talking to the system, AI Software 171 can translate the patient's tongue, verbal, and throat vibrations into displayed/spoken words.
(d) A power/charging Battery system 180 to power all electronics inside Controller Box 100, as well as display/screen 150 and Headset 220.
(e) Speaker 162 preferably positioned to be behind and aligned with Speaker Grill 160.
(f) Circuity 131 for interfacing Squeezer Socket 130 to Embedded Computer 170.

Thus, in a preferred embodiment, Controller Box 100 can be provided with multi-core embedded computer system 170, screen 150 to display user's information, speaker 162, one or more control knobs and preferably two knobs 151 and 161 and connections ports for a squeezer, vibration sensor, a headphone set, and external monitor. The SES controller can include a self-contained computer. Externally accessible/seen the controller can preferably include a user's screen, speaker grid, control knob(s) and various component connectors, such as, but not limited to, a hand squeezer, headset and/or monitor. Internally, the controller can include an embedded computer, a battery and other control and interface circuitry.

Figure 2:
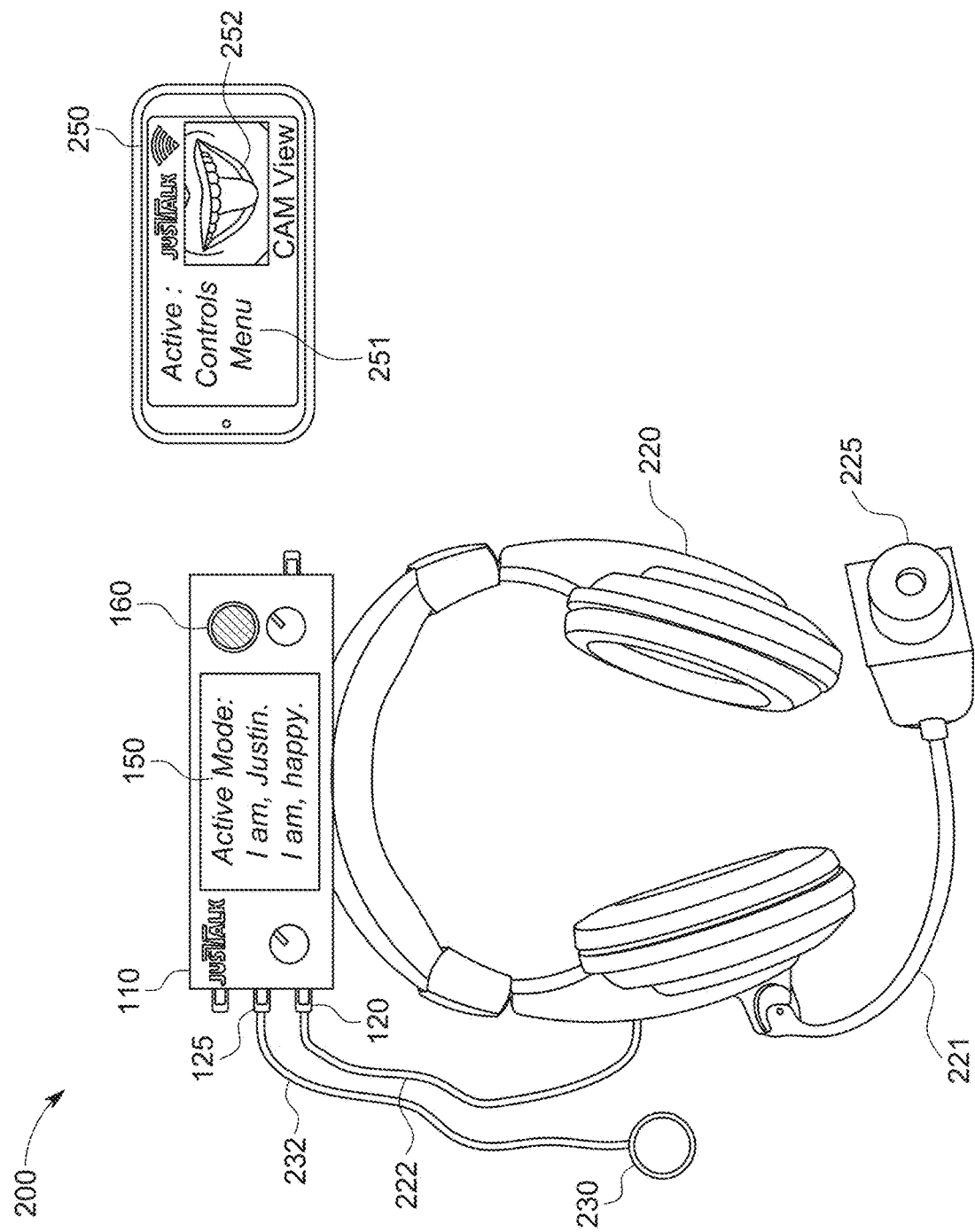
FIG. 2 illustrates a non-limiting embodiment for the novel speech enablement system in an "active" mode in accordance with the present disclosure.

FIG. 2 shows the SES system in Active Mode 200. In Active Mode 200, a Camera 225 can be pointed at the patient's mouth/tongue, and Vibration Sensor 230 can be attached to the patient's neck preferably close to the throat. AI Software 171 can be configured to read the tongue movements/verbalizations and the throat vibrations and translates such readings into actual displayed and spoken words. As noted above, Controller Box 110 can be preferably mounted to (e.g. on the top of) Headset 220 with a Cord/wire 222. Cord 222 can be secured at one end to Headset 220 and have an opposite end inserted into Headset Socket 120 of Controller Box 110 during use.

Miniature Camera 225, which can preferably be provided with audio capability, can be mounted or otherwise secured preferably to an outer end of a Headset Arm 221. When Headset Arm 221 is lowered, Camera or Miniature Camera 225 can be facing the mouth/tongue of the patient, as shown or seen CAM View 252.

Vibration Sensor 230 can be attached to the patient neck preferably close to the throat, and an outer end of its associated Cord 232 can be inserted into Vibration Sensor Socket 125 of Controller Box 110. Display 150 of Controller Box 110 can preferably show or otherwise indicate that the SES system is in Active Mode. As seen in Figure, Display/screen 150 also displays the words as attempted by the patient and interpreted/determined by AI Software 171. Speaker 162 disposed internally within controller box can be preferably positioned behind Grill 160 and can be used to audibly synthesizes the words that are displayed based on information received from AI Software 171.

Support Device 250 can also be connected to Controller Box 110 and preferably is wirelessly connected, such that the caregiver who preferably possesses Support Device 250, is not constrained or limited in movement as could be the case with a wired connection between Support Device 250 and Controller Box 110 (though a wired connection is still considered within the scope of the disclosure). Support Device 250 can be used by the caregiver to adjust and control one or more, and preferably all, of the parameters of Software 171 in both modes, Training and Active. Support Device 250, which can be an electronic device, such as, but not limited to, a smart phone or electronic tablet, can also be used to view, preferably in real-time, the video recording and/or images captured by Camera 225, CAM View 252 which is seen in the screen/display 251 of Support Device, provides an image/video currently being captured to the caregiver (or other individual using Support Device 250), to aid the caregiver during adjusting the position of Camera 225 with respect to the patient (i.e. CAM View allows for proper adjustment for the Camera 225 position).

Accordingly, Controller Box 110 can be mounted or secured on top of Headset 220 having an associated Camera 225 pointed at the patient's mouth/tongue. In the Active Mode (i.e. patient is moving the tongue and possibly making noises), AI Software 171 can display the determined spoken word(s) from the patient and/or audibly announce the word through the provided speaker. The provided Support Device 250 can be used by the caregiver to set the camera position and any other parameters required for the system to work properly in the Active Mode.

Figure 3:
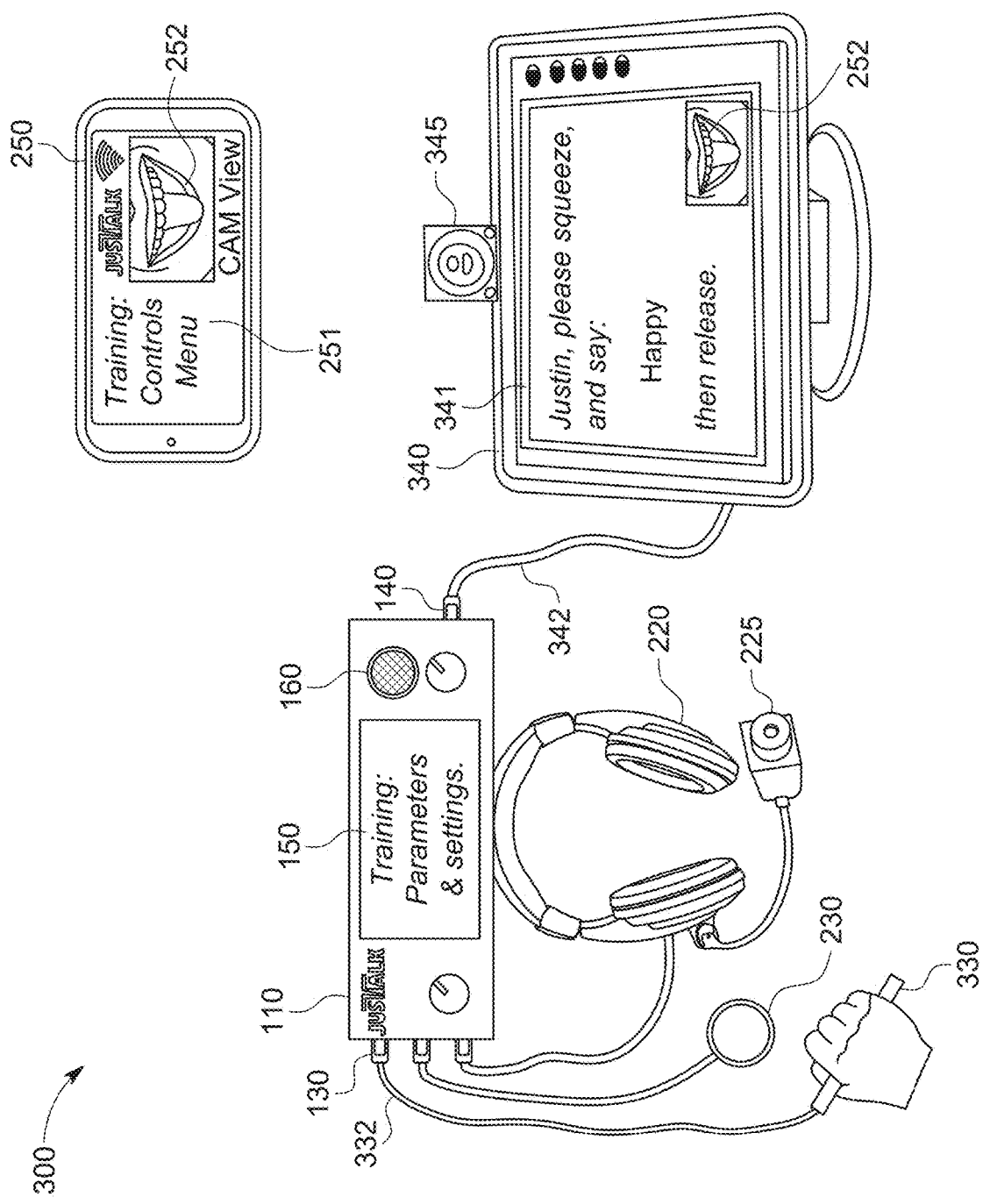
FIG. 3 illustrates a non-limiting embodiment for the novel speech enablement system in a "training" mode in accordance with the present disclosure.

FIG. 3 shows the SES System being used in a Training Mode 300. In the Training Mode, Camera 225 can be preferably pointed at the patient's mouth/tongue, and Vibration Sensor 230 can be attached to the patient neck preferably close to the patient's throat. AI Software 171 reads the tongue movement/verbalizations and the throat vibrations based on received information that can be captured by Camera 225 and Vibration Sensor 230. In addition, and for the training purposes, the SES System can be preferably provided with two additional components for the patient to interact with, namely, Squeezer 330 and Monitor 340.

In use, the patient preferably wears the Headset 220 with attached Controller Box 110 and with the Camera 225 pointed at the patient's mouth/tongue. Vibration Sensor 230 can be preferably taped or otherwise secured to the patient's neck close to the throat for detecting the vocal vibration as the patient is attempting to talk. The patient holds the Squeezer 330 which can be connected/in communication with Controller 110 through Squeezer Socket 130 via an air hose 332. The received squeezing signal can be used by the AI Software 171 to detect the beginning of a new spoken word by the patient. Monitor 340 can be connected/in communication with Controller 110, through its Cord 342 via the Monitor Socket 140. Preferably, AI Software 171 can constantly interact with the patient via Messages 341 displayed on the Monitor 340 to train the SES system with new words. In one non-limiting embodiment, the Training sequence goes as follows:

AI Software 171 can display a Message 341 on Monitor 340 instructing the patient by name, for example, "Justin," to:

Squeeze Squeezer 330,

Say a specific selected word, as a non-limiting example, "Happy,"

Then release Squeezer 330.

Monitor 340 can also show the patient the mouth/tongue movement via CAM View 252 displayed by Support Device 250. This can help or aid the patient during the Training sessions to better control the tongue movement and make them more consistent and repeatable.

AI Software 171 can preferably record the tongue, verbal, and throat vibrations. Preferably, AI Software 171 can repeat the process many times for each selected word. AI Software 171 can then extract unique features relevant to the selected word from each attempt, and aggregate all features, to allow some tolerance for minor deviation. The amount of permitted deviation permitted can be configured into AI Software 171. The extracted unique features can then be saved as a new learned word, which can be considered an identifier for this selected word.

Positioning of Camera 225, training words selection, and all other AI Software 171 parameters can be preferably controlled and adjusted by the caregiver or other individual designated to use or control Support Device 250. Preferably, in special, selected and/or designated cases depending on the patient's ability, Camera 225 can be replaced by another Camera 345 preferably mounted or secured on the top of the Monitor 340.

Accordingly, in the Training Mode the patient can be wearing Headset 220 (with mounted Controller Box 110) and interacts with Squeezer 330 and Monitor 340, while Vibration Sensor 230 reads or captures throat signals/movements from the patient which are forwarded/transmitted to AI Software 171 for further processing. Monitor 240 can show or display a Message that instructs the patient to squeeze Squeezer 330 and/or say a selected word. AI Software records the patient's tongue movements and/or throat vibrations if any and extracts their features (i.e. based on information/data received from one or more devices connected to the Controller via the associated sockets on Controller Box 110). Positioning of Camera 225 and one or more training parameter can be controlled, updated, entered and/or adjusted by Support Device 250, preferably by a caregiver or other designated or selected individual.

Figure 4:
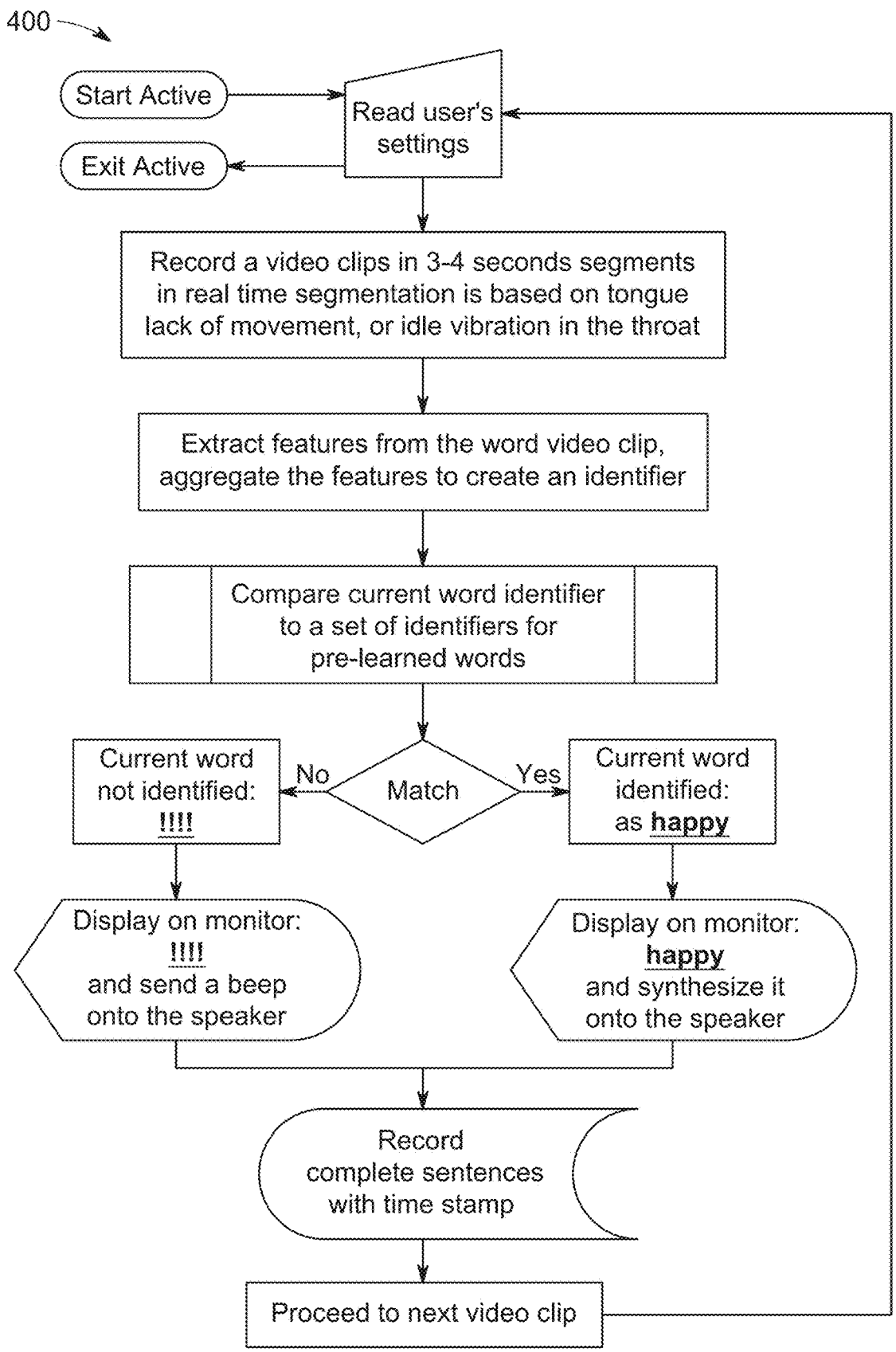
FIG. 4 illustrates a non-limiting process flow embodiment for use of the novel speech enablement system in the "active" mode in accordance with the present disclosure.

FIG. 4 illustrates a flowchart for a preferred non-limiting embodiment for the Active Mode algorithm of the AI Software 171, with the patient wearing the Headset 220, moving his or her tongue, and possibly verbalizing (i.e., throat vocalization), and with AI Software 171 processing information/data received and translating the attempted "words" into displayed and/or spoken words. As seen, the software can start/begin automatically in Active Mode once the system is turned on preferably by rotating the designated knob, button, switch, etc. (i.e. Knob 161 etc. on Controller Box 110) clockwise a notch just to click the on/off switch on. If audio is not required, silence can be achieved by leaving the Knob 161 all the way counterclockwise just beyond the on-click. The volume can then be adjusted higher by turning the Knob 161 clockwise all the way to the maximum.

Once AI Software 171 reads all user's settings, it can be preferably configured or programmed to enter an infinite loop (i.e. steps can be preferably repeated for additional words) where:
 a. AI Software 171 can record video segments (e.g. 3-4 seconds long) from Camera 225. The segments can be isolated by identifying silence in audio, stationary tongue movement, and/or reduced/lack of throat vibration.
 b. Each of these video segments (i.e., which can represent different words) can be analyzed by AI Software 171 separately to extract unique features and can be aggregated to create a unique identifier for the specific intended "word."
 c. The identifier for the "word" can be compared to the set of stored identifiers belonging to previously pre-learned words during earlier training sessions of the patient.
 d. If the current identifier matches any prerecorded one in the set (as preferably determined by the AI Software), then the "word" can be identified and displayed on Screen 150 and synthesized on/via Speaker 162.
 e. Where the "word" is not identified, a "!!!!" or other predetermined message can be sent for display preferably on Screen 150 and/or a "beeping" or other predetermined noise can also be sent and heard preferably through Speaker 162 (the message and noise can also be seen/heard on Support Device 250). In this case, the caregiver has the option to interrupt the Active mode and enter the Training Mode, so that new words can be added to the database, to expand the set of pre-learned words for the patient.
 f. AI Software 171 can loop back to step a. handle the next word being attempted and/or repeat the steps for the current word where more attempts of the current word are determined by AI Software 171 to be needed.
 g. AI Software 171 can also be configured/programmed to record complete sentences for future expansion.

Figure 5:
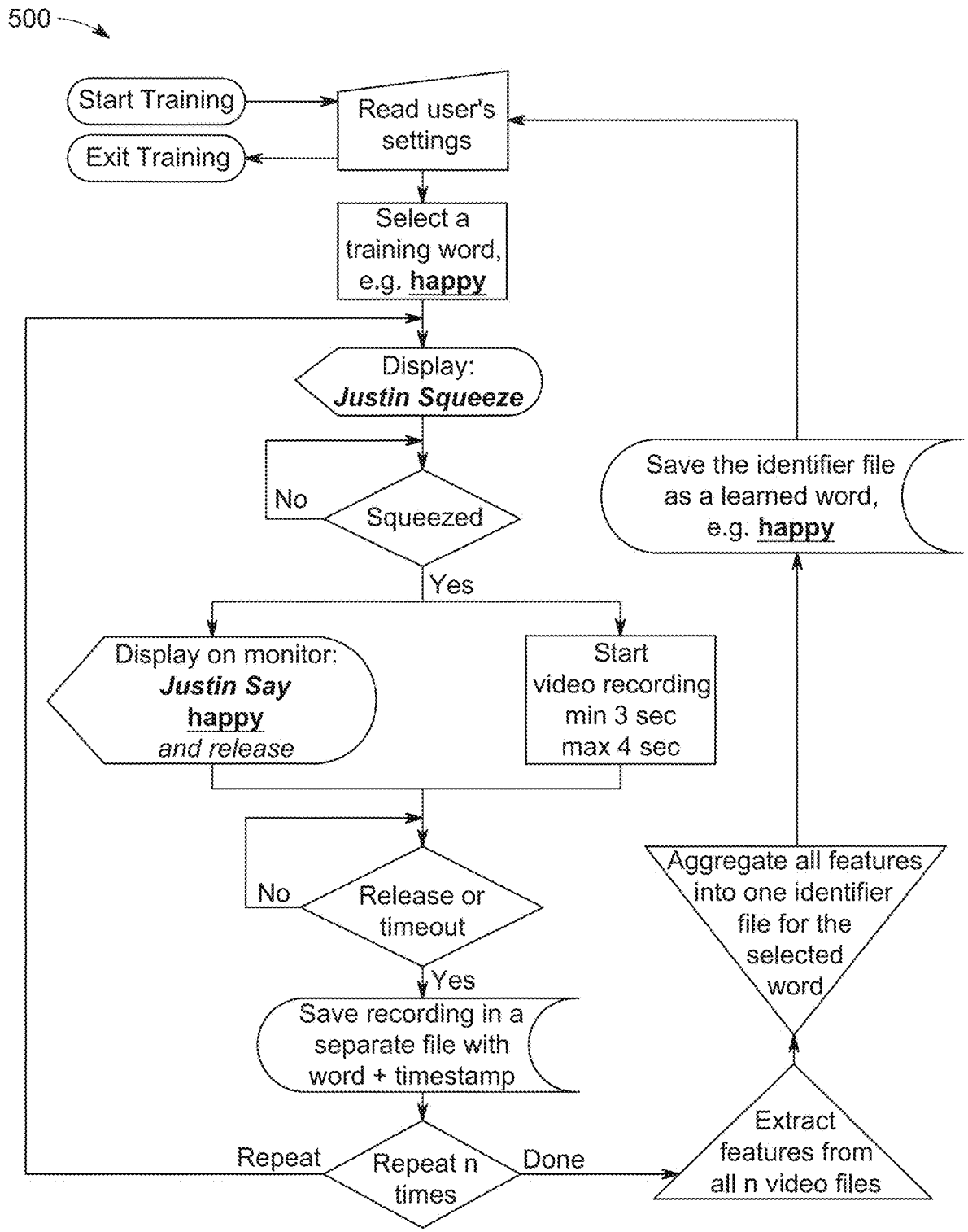
FIG. 5 illustrates a non-limiting process flow embodiment for use of the novel speech enablement system in the "training" mode in accordance with the present disclosure.

FIG. 5 illustrates a flowchart for a preferred non-limiting embodiment for the Training Mode algorithm of the SES AI Software 171, with the patient wearing the Headset 220 and watching/interacting with the instructions from a Message 341 preferably being displayed on Monitor 340. AI Software 171 can ask or otherwise instruct the patient to say a word after a triggering squeeze of Squeezer 330. AI Software 171 can record, process and/or analyze information received concerning tongue movement and throat vibration by the patient when saying the word. The novel system preferably can repeat the same word many times to gain tolerance over movement variations by the patient when saying the word.

Preferably using Control Knob 151 or another designated knob, button, switch, etc., the caregiver or other designated individual can switch the SES System to Training Mode. It is also within the scope of the disclosure that inputs by caregiver on Support Device 250 can also cause the system to switch to Training Mode or Active Mode.

Once SES AI Software 171 reads all user's settings, it can be preferably configured or programmed to enter an infinite loop where:
 a. The caregiver or other designated individual can select a word for training preferably from a set of carefully selected training words chosen beforehand by the caregiver or other individual, doctor, etc. and preferably entered into the system using Support Device 250.
 b. AI Software 171 can display on the Monitor 340 a Message 341 instructing the patient preferably by his name, e.g., "Justin," to squeeze Squeezer 330.
 c. The Software preferably can wait for the squeezing by the patient to happen, and once squeezing is detected by AI Software 171:
  i. AI Software 171 can update Message 341 on Monitor 340 and instruct the patient to say the selected word, e.g., "Happy," and release Squeezer 330; and.
  ii. AI Software preferably automatically and virtually immediately can start recording a video segment from Camera 225 preferably for at least a (preferably preconfigured) duration minimum (e.g. 3 seconds etc.), and preferably for a (preferably preconfigured) maximum (e.g. 4 seconds, etc.). The minimum and maximum time limits can be adjustable as a part of the initial settings on the Support Device 250 by the caregiver or other designated individual.
 d. Once Squeezer 330 device is released or timed out after 4 seconds, the recording can be terminated/stopped, and the recorded video segment can be saved as a video file, with its name preferably being the selected word itself plus a time stamp (though other identifying information can be used and is considered within the scope of the disclosure).
 e. The above-described Training Mode process can be repeated "n" times for the same selected word. The n variable can be preferably set up/configured at the initial settings on the Support Device 250.
 f. Once the process is repeated for "n" times, AI Software 171 can start extracting unique features from all the video files related to the same selected word. Different files can generate slightly different variations of similar features related to the same word.
 g. AI Software 171 can aggregate these variations and generate a unique identifier file that relates to the selected word and named with the same word.
 h. AI Software 171 can loop back to handle the next selected word and enter the above-described training loop/steps.
 i. Once the training steps for preferably all of the words from the selected set of words is exhausted/performed, all identifier files can be added to the set of learned words for comparison during the Active Mode as described above in connection with FIG. 4.

Some of the advantages, benefits and/or features of the novel speech enabling system and method described herein, include, without limitation:

1. A self-contained speech-enabling system preferably comprising the following components:
   1.1. A Controller Box which can comprise:
      1.1.1. A multi-core embedded computer system
      1.1.2. A screen to display user's information.
      1.1.3. A speaker
      1.1.4. One or more and preferably two control knobs, and
      1.1.5. Connections ports for a squeezer, vibration sensor, a headphone set, and external monitor.
   1.2. A headphone set to be worn by the patient, which can comprise:
      1.2.1. A microphone placed at the tip of an adjustable arm.
      1.2.2. A miniature camera preferably mounted next to the microphone and positioned to face the patient's mouth and tongue.
   1.3. A vibration sensor to be taped or otherwise secured on the neck of the patient next to throat.
   1.4. A squeezing device used by the patient to squeeze to indicate an action.
   1.5. An external monitor.
   1.6. A hand-held control panel such as a minicomputer, a tablet, or a smart phone, and
   1.7. An embedded software program Artificial Intelligence algorithm preferably running on the multi-core embedded computer system, which can read the movement of the patient's tongue, and the vibration of the throat, to determine the words the patient is trying to speak.
2. The system is configured to preferably function in two modes of operations:
   2.1. The Active Mode, where:
      2.1.1. The patient is wearing the Headphone set on the head and the Vibration Sensor on the neck.
      2.1.2. The patient is attempting to say words by exerting activities such as tongue movements, and/or throat vocalizations.
      2.1.3. The AI Software translates the patient's activities into displayed and/or spoken words.
   2.2. The Training Mode, where:
      2.2.1. The patient is wearing the Headset and the Vibration Sensor
      2.2.2. The patient can interact with the AI Software via two devices, a hand Squeezer, and an external Monitor.
      2.2.3. The AI Software performs the training by displaying instructions on the Monitor to the patient, such as, but not limited to, saying one word at a time, and recording the patient activities, which are analyzed and saved as a set of learned words.
3. The Artificial Intelligence algorithm/software can translate the patient's activities into displayed and/or spoken words as follows:
   3.1. The patient attempts to say words by exerting activities such as tongue movements, and/or throat vocalizations and/or vocalizations.
   3.2. The AI Software records the patient's activities for each attempted word and extracts specific features which are aggregate as an identifier file for that specific word.
   3.3. The identifier can be compared to a set of stored identifiers belonging to pre-learned words during the Training Mode.
   3.4. If the AI software finds a match, then the attempted word is identified, and it is displayed on the display and/or synthesized/pronounced on the provided speaker preferably in real-time.
4. The Artificial Intelligence algorithm/program trains or otherwise allows the system to learn new words, can interact with the patient as follows:
   4.1. The AI Software can display a message on the Monitor asking the patient to squeeze the squeezer and say a selected word, for example "Happy."
   4.2. The software can record the patient's activities such as, but not limited to, the patient's tongue/lips movement, audible vocals and throat vibration.
   4.3. The system can preferably instruct the patient to repeat the same selected word many times to gain some degree tolerance over movements variations.
   4.4. Preferably all of the multiple recorded activities for the same word are saved as video clips with each file name can preferably be the word itself and the timestamp.
   4.5. The AI Software can read all video clips for the same word and can extract specific features and can aggregate them and can save the result as a unique identifier file for that specific word.
   4.6. The identifier for each new word can be saved as a file with the name being the word and added to the set of words learned by the system so far for the patient.

All locations, sizes, shapes, measurements, amounts, angles, voltages, frequencies, component or part locations, configurations, temperatures, weights, dimensions, values, time periods, percentages, materials, orientations, communication methods, connection methods, etc. discussed above or shown in the drawings are merely by way of example and are not considered limiting and other locations, sizes, shapes, measurements, amounts, angles, voltages, frequencies, component or part locations, configurations, temperatures, weights, dimensions, values, time periods, percentages, materials, orientations, communication methods, connection methods, etc. can be chosen and used and all are considered within the scope of the invention.

Dimensions of certain parts as shown in the drawings may have been modified and/or exaggerated for the purpose of clarity of illustration and are not considered limiting.

It is expected that advancements in electronics, digital data processing and/or digital communications may simplify the design of this system and such advancements shall be considered available for use in the current described system and method.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic (s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the disclosure has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A speech-enabling system to enhance communication with a person where the person has lost the ability to speak but can still move his or her tongue or the person can only make unfathomable sounds which are unable to be recognized as intelligible words, comprising:
   a computer system running a software program for operating the system in an active mode and a training mode;
   a microphone in communication with the software program;
   a camera in communication with the software program;
   a speaker in communication with the software program;
   a system triggering device in communication with the software program;
   a vibration sensor adapted to be secured to the patient at a position where the vibration sensor can pick up or sense throat movements by the patient, the vibration sensor in communication with the software program; and
   a monitor or display in communication with the software program;
   wherein in an operating mode when the patient attempts to speak, tongue movements by the patient are captured by the camera and digital information or data concerning the tongue movements are forwarded to and received by the software program, audio expressed by the patient is captured by the microphone and digital information or data concerning the audio is forwarded to and received by the software program, and vibrations from throat movements by the patient are captured by the vibration sensor and digital information or data concerning the throat movements are forwarded to and received by the software program;
   wherein the software program is configured to use the information or data concerning the tongue movements captured by the camera, audio captured by the microphone and vibrations from the throat movements captured by the vibration sensor and to translate the information or data into a known word.

2. The speech-enabling system of claim 1 wherein the software program is configured to display the translated known word on the monitor.

3. The speech-enabling system of claim 1 wherein the software program is configured to verbally pronounce the translated known word via the speaker.

4. The speech-enabling system of claim 1 further comprising a headset adapted to be worn by the patient in both a training mode and an active mode for the system; wherein the microphone and camera are secured to the headset such that they the microphone and the camera are positioned to face a patient's mouth area.

5. The speech-enabling system of claim 4 wherein the headset having an adjustable arm and the microphone and camera are secured to the adjustable arm.

6. The speech-enabling system of claim 1 further comprising one or more control knobs in communication with the software program; a first of the one or more control knobs used for switching the system back and forth between operating in active mode and operating in training mode.

7. The speech-enabling system of claim 1 further comprising a screen in communication with the software program.

8. The speech-enabling system of claim 1 further comprising a controller box; wherein the computer system is an embedded computer system and disposed within the controller box; wherein the speaker is disposed internally within the controller box; wherein the controller box having a speaker grill secured to an outer wall of the controller box and aligned with the speaker and one or more externally accessible control knobs in communication with the embedded computer system for switching the embedded computer system back and forth between an active operating mode and a training operating mode.

9. The speech-enabling system of claim 8 wherein the controller box further comprising an externally visible display screen in communication with the software program; wherein the software program is configured to display the translated words spoken by the patient on the externally visible display screen.

10. The speech enabling system of claim 8 further comprising a headset adapted to be worn by the patient; wherein the microphone and camera are secured to the headset such that the microphone and the camera are positioned to face a patient's mouth area; wherein the controller box is secured to the headset.

11. The speech-enabling system of claim 8 wherein the controller box further comprising an externally visible display screen in communication with the software program; wherein the software program is configured to display the translated words spoken by the patient on the externally visible display screen.

12. The speech enabling system of claim 1 further comprising a control software program running on a portable electronic device and in communication with the software program running on the computer system; wherein the control software program allows a person different from the patient to control one or more operation of the speech enabling system using the portable electronic device.

13. The speech enabling system of claim 12 wherein the control software program is in wireless communication with the software program running on the computer system.

14. The speech enabling system of claim 1 wherein the triggering device is a squeezer in electronic communication with the software program for use during a training mode session for the system where the patient squeezes the squeezer to inform the software program when the patient is about to attempt to speak a word displayed on the monitor by the software program.

15. A speech-enabling system to enhance communication with a person where the person has lost the ability to speak but can still move his or her tongue or the person can only make unfathomable sounds which are unable to be recognized as intelligible words, comprising:
   a controller box having a speaker grill secured to an outer wall of the controller box;

a computer system running a software program for operating the system in an active mode and a training mode, the computer system disposed within the controller box;

a microphone in communication with the software program;

a camera in communication with the software program;

a speaker in communication with the software program and disposed internally within the controller box at a position where the speaker is aligned with the speaker grill;

a system triggering device in communication with the software program;

a vibration sensor adapted to be secured to the patient at a position where the vibration sensor can pick up or sense throat movements by the patient, the vibration sensor in communication with the software program;

one or more externally accessible control knobs in communication with the computer system for switching the computer system back and forth between an active operating mode and a training mode;

a control software program running on a portable electronic device and in communication with the software program running on the computer system; wherein the control software program allows a person different from the patient to control one or more operation of the speech enabling system using the portable electronic device; and a monitor or display in communication with the software program;

wherein in an operating mode when the patient attempts to speak, tongue movements by the patient are captured by the camera and digital information or data concerning the tongue movements are forwarded to and received by the software program, audio expressed by the patient is captured by the microphone and digital information or data concerning the audio is forwarded to and received by the software program, and vibrations from throat movements by the patient are captured by the vibration sensor and digital information or data concerning the throat movements are forwarded to and received by the software program;

wherein the software program is configured to use the information or data concerning the tongue movements captured by the camera, audio captured by the microphone and vibrations from the throat movements captured by the vibration sensor and to translate the information or data into a known word.

16. The speech enabling system of claim 15 wherein the triggering device is a squeezer in electronic communication with the software program for use during a training mode session for the system where the patient squeezes the squeezer to inform the software program when the patient is about to attempt to speak a word displayed on the monitor by the software program.

17. The speech enabling system of claim 15 further comprising a headset adapted to be worn by the patient; wherein the microphone and camera are secured to the headset such that the microphone and the camera are positioned to face a patient's mouth area; wherein the controller box is secured to the headset.

18. The speech-enabling system of claim 17 wherein the headset having an adjustable arm.

19. The speech-enabling system of claim 15 wherein the software program is configured to display the translated known word on the monitor.

20. The speech-enabling system of claim 15 wherein the software program is configured to verbally pronounce the translated known word via the speaker.

* * * * *